United States Patent
Settle et al.

(10) Patent No.: US 11,294,748 B2
(45) Date of Patent: Apr. 5, 2022

(54) IDENTIFICATION OF CONSTITUENT EVENTS IN AN EVENT STORM IN OPERATIONS MANAGEMENT

(71) Applicant: International Business Machines Corporation, Armonk, NY (US)

(72) Inventors: Jonathan Ian Settle, Dursley (GB); Kristian Jon Stewart, Surrey (GB); Haydn Richard Davis, Plymouth (GB)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 16/686,249

(22) Filed: Nov. 18, 2019

(65) Prior Publication Data

US 2021/0149754 A1   May 20, 2021

(51) Int. Cl.
*G06F 11/00* (2006.01)
*G06F 11/07* (2006.01)
*G06F 11/30* (2006.01)

(52) U.S. Cl.
CPC ........ *G06F 11/076* (2013.01); *G06F 11/0772* (2013.01); *G06F 11/3006* (2013.01); *G06F 11/3055* (2013.01); *G06F 2201/81* (2013.01); *G06F 2201/86* (2013.01)

(58) Field of Classification Search
CPC .............. H04L 63/1425; G06F 11/076; G06F 11/0772; G06F 11/3055; G06F 11/3006; G06F 2201/86; G06F 2201/81
USPC ......................................... 714/704–706, 708
See application file for complete search history.

(56) References Cited

U.S. PATENT DOCUMENTS

| | | | |
|---|---|---|---|
| 7,120,717 B2 * | 10/2006 | Vu | G06F 13/24 710/262 |
| 8,949,676 B2 | 2/2015 | Behrendt | |
| 9,270,562 B2 | 2/2016 | Curtis | |
| 10,516,595 B2 * | 12/2019 | Sheleheda | H04L 41/069 |
| 2006/0242286 A1 * | 10/2006 | Hawkins | G06F 11/0748 709/223 |

(Continued)

FOREIGN PATENT DOCUMENTS

| CN | 102034148 A | 4/2011 |
|---|---|---|
| CN | 106131022 A | 11/2016 |
| CN | 110324168 A | 10/2019 |

OTHER PUBLICATIONS

International Search Report and Written Opinion, International Application No. PCT/IB2020/060609, International Filing Date Nov. 18, 2019.

(Continued)

*Primary Examiner* — Albert Decady
*Assistant Examiner* — Osman M Alshack
(74) *Attorney, Agent, or Firm* — Alexander G. Jochym

(57) ABSTRACT

A method and system are provided for identification of constituent events in an event storm in operations management. The method includes: detecting an event storm by detecting an anomaly from a dynamic baseline range of expected event rates in a sample time period; and, when an event storm is detected, for each of a group of events grouped by an event category and occurring in a sample time period of an event storm, identifying the group of events as constituting part of the event storm if the rate of the event occurrences of the group in the sample time period is outside a threshold deviation from an average for that group.

22 Claims, 6 Drawing Sheets

(56) References Cited

U.S. PATENT DOCUMENTS

| | | | | |
|---|---|---|---|---|
| 2010/0052924 | A1* | 3/2010 | Bajpay | H04L 41/0631 340/635 |
| 2013/0305080 | A1* | 11/2013 | Behrendt | G06F 11/3082 714/2 |
| 2014/0280897 | A1* | 9/2014 | Curtis | H04L 41/06 709/224 |
| 2014/0334739 | A1* | 11/2014 | Man | G06K 9/6272 382/200 |
| 2016/0124823 | A1* | 5/2016 | Ruan | G06F 11/0709 714/26 |
| 2017/0091008 | A1* | 3/2017 | Cherbakov | G06F 11/079 |
| 2017/0364402 | A1* | 12/2017 | Chua | G06F 11/0751 |
| 2020/0201744 | A1* | 6/2020 | Ho | G06F 11/3636 |

OTHER PUBLICATIONS

Albaghdadi, et al., "Event Storm Detection and Identification in Communication Systems", An IP.com Prior Art Database Technical Disclosure, Original Publication Date: May 1, 2006, IP.com No. IPCOM000141992D, IP.com Electronic Publication Date: Nov. 7, 2006, 24 pages, <https://priorart.ip.com//IPCOM/000141992>.

Bellec, et al., "Fuzzy Event Correlation Algorithm in Wide Telecommunication Networks", International Journal of Multimedia and Ubiquitous Engineering, vol. 3, No. 2, Apr. 2008, pp. 103-116.

Mell et al., "The NIST Definition of Cloud Computing", Recommendations of the National Institute of Standards and Technology, NIST Special Publication 800-145, Sep. 2011, 7 pages.

* cited by examiner

IDENTIFICATION OF CONSTITUENT EVENTS IN AN EVENT STORM IN OPERATIONS MANAGEMENT

BACKGROUND

The present invention relates to log event operations management, and more specifically, to identification of constituent events in an event storm in operations management.

Information technology operations management aims to identify, isolate and resolve information technology issues in business environments by logging events and applying analytics to the event log. As examples, the operations may relate to a wide range of infrastructures that may be geographically distributed relating to communications, computing resources, storage resources, networks, etc.

In information technology environments, event logs record events taking place in the execution of a system in order to provide an audit trail that can be used to understand the activity of the system and to diagnose problems. Event logs are necessary to understand the activities of complex systems, particularly in the case of applications with little user interaction such as server applications. Statistical analysis using operations analytics may be used to analyze events and determine correlations between seemingly unrelated events.

In event log management, operation personnel expect a normal rate of events, with events happening due to maintenance or problems. However, sometimes an event storm can happen when the volume of incoming events swamps the operation personnel's ability to cope with them. This is often referred to as a "Sea of Red". This means operations personnel cannot distinguish the important events and also what else might be happening.

A storm is often triggered by a major incident. For example, something like a core switch going down in the network, part of the monitoring system failing, etc. Such situations would cause a large number of devices, subsystems and applications to send alerts or events to a monitoring system, all reporting effectively the same problem from that system's point of view.

A most common approach to detect such event storms is for a system engineer to set up static thresholds of an event type based on past experience. For example, an event type may be "LINK DOWN" and if the number of "LINK DOWN" log events exceeds the threshold number within a defined period, a storm is declared and all events of that event type are grouped together.

SUMMARY

According to an aspect of the present invention there is provided a computer-implemented method for identification of constituent events in an event storm in operations management, comprising: detecting an event storm by detecting an anomaly from a dynamic baseline range of expected event rates in a sample time period; and when an event storm is detected, for each of a group of events grouped by an event category and occurring in a sample time period of an event storm, identifying the group of events as constituting part of the event storm if the rate of the event occurrences of the group in the sample time period is outside a threshold deviation from an average for that group.

This has the advantage that there is a link between an event storm detection and identification of events contributing to the event storm by using statistical evaluation of event instances in a sample time period within the detected storm. This reduces the number of false positives of events being labeled as contributing to a storm.

The method may include correlating multiple groups of events identified as constituting part of the event storm for output.

The method may include learning an expected event rate in one or more defined lengths of sample time periods. Detecting an event storm may include: using a dynamic threshold algorithm to determine a dynamic baseline range of expected event rates in the one or more defined lengths of sample time periods; and using an anomaly detection algorithm to detect an anomaly from the dynamic baseline range indicating an event storm. Using operations analytics may accurately identify an event storm occurrence.

The method may also include learning event attribute information in one or more defined lengths of sample time periods. The event category may include an individual event attribute or a cluster of event attributes based on a distance metric. Groups of events may include a minimum number of event instances. The distance metric of the event attributes for clustering may be one of the group of: a text string metric; a location metric; or other metric derived from event log entry information. Learning event attributes of events in an environment is used to group events by individual attributes and/or by clustering based on a distance metric of event attributes. Event attributes may be derived from information available in an event log entry.

The method may include clustering events in a sample time period by a distance metric of event attributes. In one embodiment, if a group based on individual event attributes is not above a threshold deviation for the individual event attribute in a sample time period, the method may cluster multiple individual event attributes to form a group of events.

The method may include testing the clustering to meet a threshold percentage of event instances belonging to the cluster in a sample time period. The method may also include selecting a clustering by comparing clusters with varying distance metrics in a sample time period. Testing clusters and selecting the strongest clusters strengthens the system and makes it risk averse. It also enables fragmented event instances to be clustered and identified as relating to the event storm.

The sample time periods may be configured for granularity of the event storm detection and may include a short time window and a longer time window to capture different event storm behavior. Event storms may have different time frames and configuring differing sample time periods or windows helps detect different forms of event storms, whether they are slow brewing storms or sudden squalls of events.

A threshold deviation for a group of events may be measured from an average for that group using statistical deviation methods such as a threshold Z-Score test of the group of events. Many statistics threshold tests are available and may be selected based on the overall statistical pattern of events. In a case where events follow a normal distribution, standard deviation tests may be appropriate.

According to another aspect of the present invention there is provided a computer-implemented method for identification of constituent events in an event storm in operations management, comprising: detecting an event storm by detecting an anomaly from a dynamic baseline range of expected event rates of an overall event population in a sample time period; and, for a sample time period in a detected event storm, identifying event instances as being constituent events of the storm by clustering event attributes and determining if a rate of occurrence of event instances in the cluster in the sample time period is a threshold deviation from the norm for the clustered event attributes.

This has the advantage of clustering event instances by a distance metric based on event attributes available in a log entry. Grouping individual attributes that deviate may exclude some log entries that are relevant but have differing attributes.

According to a further aspect of the present invention there is provided a system for identification of constituent events in an event storm in operations management, comprising: a processor and a memory configured to provide computer program instructions to the processor to execute the function of the components: an event storm detection component for detecting an event storm by detecting an anomaly from a dynamic baseline range of expected event rates in a sample time period; and an event constituent identification component for each of a group of events grouped by an event category occurring in a sample time period of an event storm, identifying a group of events as constituting part of the event storm if the rate of the event occurrences of the group in the sample time period is outside a threshold deviation from an average for that group.

The system may include an event constituent correlating component for correlating multiple groups of events identified as constituting part of the event storm.

The event storm detection component may include: a dynamic threshold component for using a dynamic threshold algorithm to determine a dynamic baseline range of expected event rates in the one or more defined lengths of sample time periods; and an anomaly detecting component for using an anomaly detection algorithm to detect an anomaly from the dynamic baseline range indicating an event storm.

The system may include a learning component for learning an expected event rate in one or more defined lengths of sample time periods and for learning event attribute information in the one or more defined lengths of sample time periods.

The system may include an attribute clustering component for clustering events in a sample time period by a distance metric of event attributes. The attribute clustering component may include testing the clustering to meet a threshold percentage of event instances belonging to the cluster in a sample time period. The attribute clustering component may include selecting a cluster by comparing clusters with varying distance metrics in a sample time period.

The system may include a configuration component for configuring sample time periods for granularity of the event storm detection including a short time window and a longer time window to capture different event storm behavior.

According to a further aspect of the present invention there is provided a system for identification of constituent events in an event storm in operations management, comprising: a processor and a memory configured to provide computer program instructions to the processor to execute the function of the components: an event storm detection component for detecting an event storm by detecting an anomaly from a dynamic baseline range of expected event rates of an overall event population in a sample time period; and an event constituent identification for identifying event instances as being constituent events of the storm for a sample time period in a detected event storm by clustering event attributes and determining if a rate of occurrence of event instances in the cluster in the sample time period is a threshold deviation from the norm for the clustered event attributes.

According to a further aspect of the present invention there is provided a computer program product for identification of constituent events in an event storm in operations management, the computer program product comprising a computer readable storage medium having program instructions embodied therewith, the program instructions executable by a processor to cause the processor to: detect an event storm by detecting an anomaly from a dynamic baseline range of expected event rates in a sample time period; and, when an event storm is detected, for each of a group of events grouped by an event category and occurring in the sample time period, identify the group of events as constituting part of the event storm if the rate of the event occurrences of the group in the sample time period is outside a threshold deviation from an average for that group.

The computer readable storage medium may be a non-transitory computer readable storage medium and the computer readable program code may be executable by a processing circuit.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The described method and system identify constituent events in event storm detection in event log operations management. The method and system can be applied to any form of event logging in information technology environments including computing systems, communications systems, etc.

An event log provides event log entries over time as events occur in an information technology environment. The event log may be for error events, operational events, transactional events, messages, or other activities that may be recorded over time. A log entry may include multiple attributes providing information on the log entry as to what happened, when and by which component.

The described method works on two phases: firstly, detecting a storm window; and secondly, then categorizing the events that go to make up the storm to identify the constituent events of the storm.

Once a storm is detected, the method can determine what events go to constitute the storm as opposed to what events are normal activity or relate to another issue. Many systems are sufficiently large that there may be more than one problem ongoing at any one time and therefore there may be events arriving that are not part of the storm. This is achieved by using the combination of overall storm detection coupled with categorization of events.

Combining the two phases reduces the complexity of the system and avoids false correlations that may occur due to the wide variety of event types that occur outside an event storm.

Storms broadly have two groups of events, a lot of the same event type occurring (for example, ping down for core network) or lots of different alerts and different types of event occurring.

This described method and system has the advantage that it can join multiple types of event together in order to establish the presence of a storm. The described method identifies the events which constitute the storm as opposed to the events that compose the usual operating state of the system when an event storm is not present.

Figure 1A:
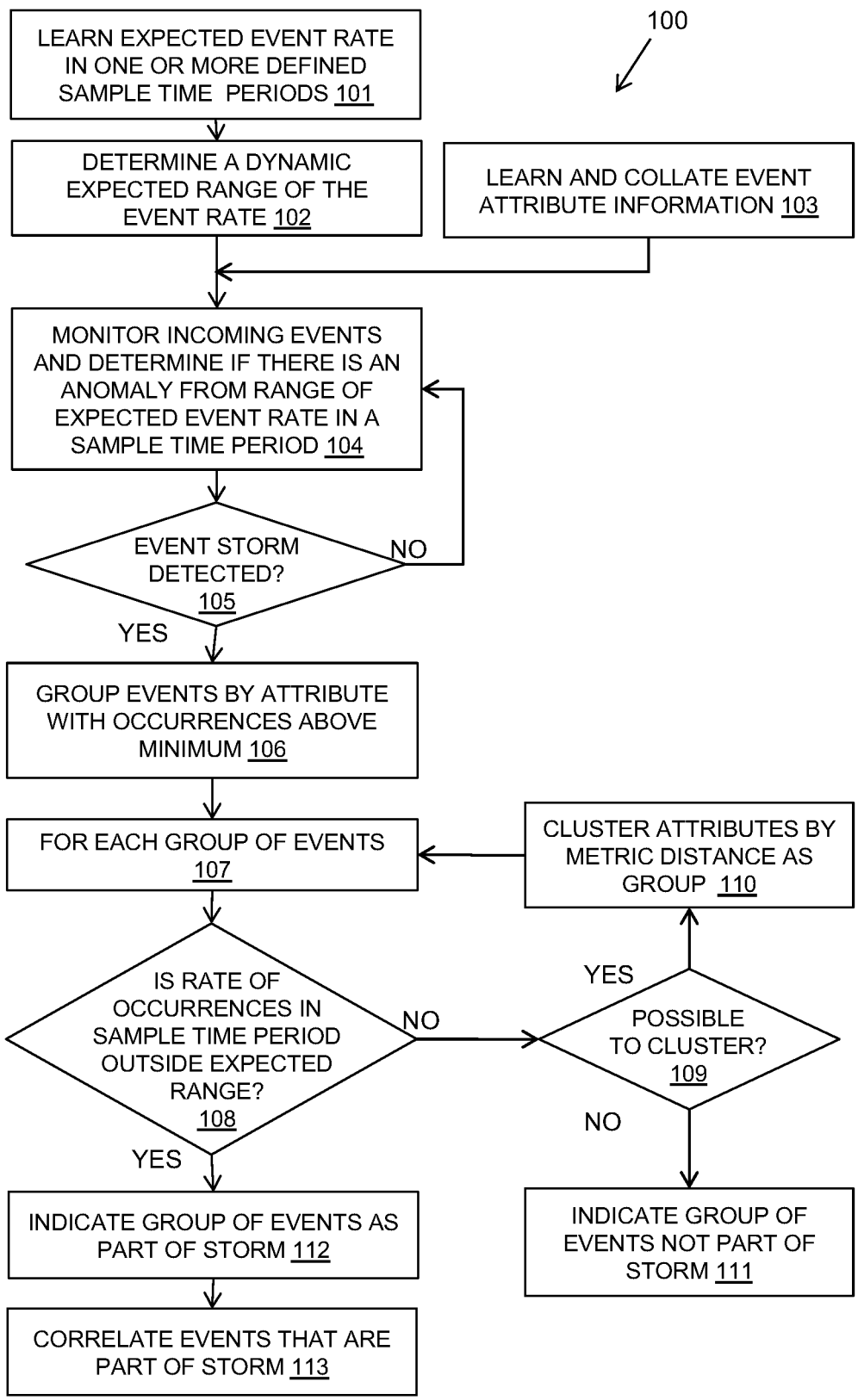
FIG. 1A is a flow diagram of an example embodiment of a method in accordance with the present invention.

Referring to FIG. 1A, a flow diagram 100 shows an example embodiment of the described method of detecting a storm in an event log and determining events that are part the storm.

The method may learn 101 an expected event rate in one or more defined sample time periods. This is the rate of all events being logged providing an overall population event rate.

The method may determine 102 a dynamic baseline range of expected event rates in one or more defined sample lengths of time periods. A dynamic threshold algorithm may be used to determine the expected range. The dynamic threshold algorithm provides a varying baseline that is dependent and accommodates factors such as a time of day or load on a system. A dynamic threshold algorithm may dynamically define a conformance threshold that varies over time based on monitored system profiles and parameters.

The sample time periods may be defined to suit a system and may be discrete time buckets or windows. More than one length of sample time period may be defined such as a short length and a longer length. This ensures that short spikes of events are captured as well longer brewing problems and edge events. In an example embodiment, time periods of 5 minutes and 20 minutes are used and event rates are continuously monitored in these time periods.

The method may also learn and collate 103 a breakdown of event attribute information of events in the event population that is used for the grouping of events and as a baseline for an expected rate of occurrences of the event attribute in a time period. Event attributes may be types of event or other suitable attributes of event instances such as geographical indications in an event log entry such as for events from a single cell site in a telecommunications environment or from a particular plant or location in a system environment.

The method may monitor 104 the incoming events in the sample time periods and determine if there is an anomaly or deviation from the dynamic baseline range of expected event rates in a sample time period that would indicate an event storm. This may use anomaly detection algorithms to detect an anomaly in the population event rate.

Anomaly detection may be carried out by various known different statistical measures. In one implementation, anomaly detection may be implemented by existing operations analytics software. For example, IBM Operations Analytics Predictive Insights (IBM is a trademark of International Business Machines Corporation) as summarized below.

An alternate approach for identifying anomalous behavior in the population event rate is to use profiling techniques to detect sudden system process change. Historic data is used to establish normal operating parameters over a time-frame of periodic behavior. The time-frame is sliced into contiguous sample time periods which can be treated individually according to the profile parameters. Then, using statistical process control techniques, short-term and long-term process changes can be detected. A short-term increase process change will be detected when an event storm occurs.

It may be determined 105 if an event storm is detected by determining an event rate anomaly as defined as a storm. If a storm is not currently detected, the method may continue to monitor 104 the incoming event rate and determine if there is an anomaly. An event storm may be detected over a series of sample time periods.

When an event storm is detected 105, the constituent events of the event storm are then identified and collated as described below based on the events occurring in a sample time period of the storm.

The events logged in a sample time period in which the event storm is detected are grouped 106 according to an event category. The category may be an event attribute such as an event type or other attribute of the events such as event location. The grouping may use the event attribute information collated 103 during the learning stage. At this stage, the groups may be groups of events with a same individual attribute in order to determine if there are a large number of events in the sample time period of the same event attribute.

Only groups of events with a number of event instances above a minimum are included. If a number of instances of an event attribute in a group is low, this group is not included in the further analysis. This is because, even if a rate of these events is outside an expected range for the group, the low number indicates that the events are not constituent events of the storm.

For each group of events 107, the method may determine 108 if the rate of the event occurrences in the sample time period is outside an expected range for that group. This may be carried out by various forms of statistical test.

The ability to perform the determination 108 of whether the rate of the event occurrences is outside an expected range is based on the breakdown of event attribute information collated 103 at the same time that the overall population event rate is determined 102.

In one embodiment, the test of being outside an expected range may be above a threshold deviation from an average of the event rate for the group. In one embodiment, this may be carried out by a Z-Score test as described below, which measures a statistical deviation for a normal distribution. Alternatively, another form of statistical deviation from an average may be used.

If it is not determined 108 that the rate of occurrences of the group is outside the expected range for the individual event attribute, it may be determined if it is possible to cluster 109 the event attribute with other event attributes that are also not outside the expected range when grouped individually.

Alternatively, the method may attempt to cluster event attributes without testing a deviation for grouped individual event attributes.

If it is possible to cluster the attributes, the method may cluster 110 event attributes together based on a distance metric as described further in relation to FIG. 1B below.

The cluster may be treated as a group of events 107 for which it is determined 108 if the rate of occurrences outside the expected range.

However, if it is not possible to cluster 109 the event attribute with other event attributes, or if the group is already a cluster, the group of events may be indicated 111 as not being constituents of the storm. Constituents of the storm are events that are a result of a problem or group of problems causing the event storm.

If it is determined 108 for a group that the rate of occurrences of the group is outside the expected range, the group of events may be indicated 112 as being constituents of the storm.

Event members from all groups that are indicated as constituents of the storm may be correlated 113 or combined as relating to the storm and displayed and handled accordingly.

Anomaly Detection Algorithms for Storm Detection

IBM Operations Analytics Predictive Insights provides an analytics component for consumption and analysis of data from multiple data sources of an organization's monitoring and performance management system. The analytics component builds a model of normal behavior of a system and then compares subsequent data that is extracted with data in the model to identify any changes in system behavior and to identify anomalies in behavior. A user interface is provided for displaying detailed information on anomalies.

Various anomaly detection algorithms are used including robust bounds that detect an anomaly when the value of a metric deviates from the metric's baseline. The baseline is the normal operating range that the algorithm dynamically maintains for a metric.

Other anomaly detection algorithms may include as examples: a variant/invariant algorithm for detecting an anomaly when the variance between a metric's high and low values reduces significantly; a Granger algorithm for detecting an anomaly by finding causal relationships between metrics and detecting an anomaly if a relationship change; a finite domain algorithm for detecting an anomaly when a metric value elevates to a level not reached previously; a predominant range algorithm for detecting an anomaly when the variation in a metric value exceeds the range within which the metric normally varies.

Each algorithm may include a training process to build a model of the data's normal operating behavior. Anomalies can be detected when data is then received at subsequent intervals.

Statistical Deviation Test for Groups of Events

The Z-test is any statistical test for which the distribution of the test statistic under the null hypothesis can be approximated by a normal distribution. It is a fair assumption, due to the central limit theorem, to assume that samples of the event rate will approximate to a normal distribution. Therefore, at any moment in time a sample of the event rate can be compared to the sample distribution to decide whether it lies within normal operating margins. A Z-test may use a Z-Score or Modified Z-Score.

A Z-Score is a numerical measurement of a value's relationship to the mean average of a group of values measured in terms of standard deviation from the mean. If a Z-Score is 0, it indicates the value is identical to the mean value. If a Z-Score is 1.0, a value is one standard deviation from the mean value. For most large data sets, 99% of values have a Z-Score between −3 and 3, meaning they lie within three standard deviations above and below the mean.

The Modified Z-Score is a standardized score that measures outlier strength or how much a particular score differs from the typical score. Using standard deviation units, it approximates the difference of the score from the median.

The Modified Z-Score might be more robust than the standard Z-Score because it relies on the median for calculating the Z-Score. It is less influenced by outliers when compared to the standard Z-Score.

The standard Z-Score is calculated by dividing the difference from the mean by the standard deviation. The Modified Z-Score is calculated from the mean absolute deviation (MeanAD) or median absolute deviation (MAD). These values are multiplied by a constant to approximate the standard deviation.

For each group of events grouped by attribute or cluster of attributes, the method may calculate Median Absolute Deviation (MAD) and Modified Z-Score value of each element for a time period when that event type occurs. For example: "linkdown"=median=10, and "machine on fire"=median=20.

If the current value for a group is above a defined threshold of 3.5 Z-Score then the group of events is identified as constituting storm events and contributing to the event storm.

It should be noted that an extra guard is needed when the count of an attribute is low. For example, in the current prototype if the MAD score is less than 2 then it is not included. This is because, even if a rate of these events is outside an expected range for the group, the low number indicates that the events are not constituent events of the storm.

Figure 1B:
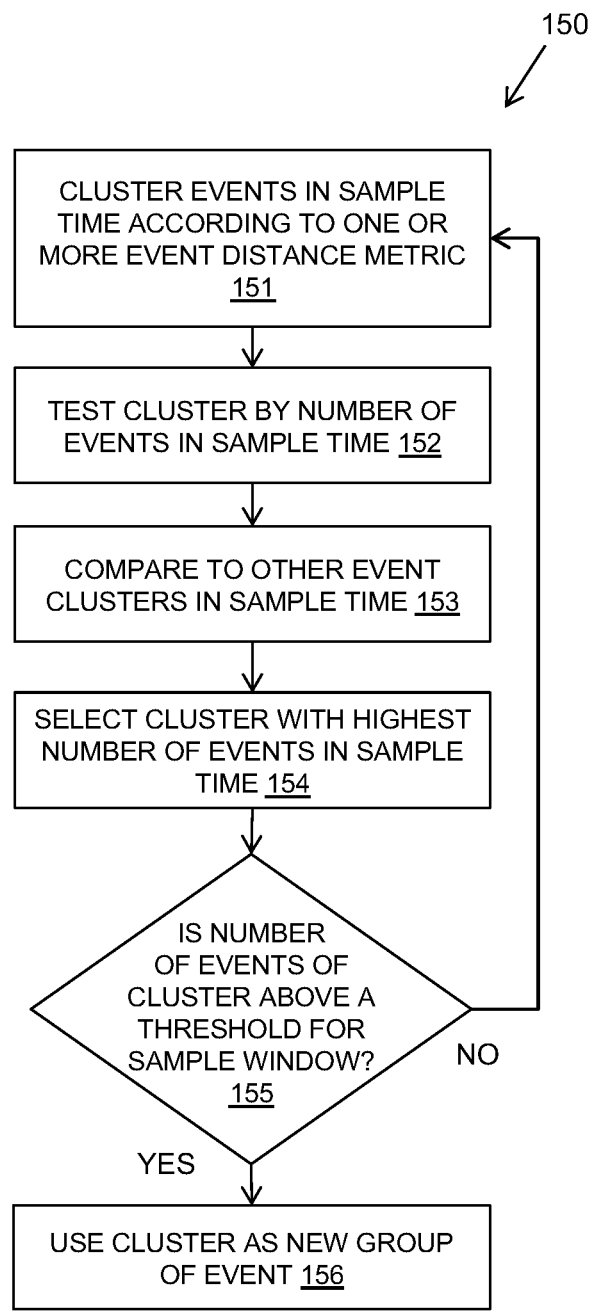
FIG. 1B is a flow diagram of an example embodiment of an aspect of a method in accordance with the present invention.

Referring to FIG. 1B, a flow diagram 150 shows an example embodiment of the aspect of the flow diagram of FIG. 1A of clustering event attributes for testing if the clustered event attributes are outside a threshold deviation from a norm for the cluster in a sample time period in which the storm is detected.

Event attributes in a sample window may be clustered 151 according to one or more distance metrics. The distance metrics may be configured for an event log scenario and based on the information available in an event log entry.

One example of a distance metric may be a text string similarity of event log entries. Another example of a distance metric may be a location similarity for location of the origin of event log entries such as by a site cell for telecommunications logs or a management plant or server location in distributed computing system logs. Other forms of distance metric may be based on the information available in log entries.

In the example of text string as a distance metric, the clustering may be carried out by using a string comparison technique such as an edit distance metric such as Jaro- Winkler distance. An edit distance quantifies how dissimilar two strings are by counting the minimum number of operations required to transform one string into the other.

For example, if there are three different event types and none are over the statistical deviation, string similarity may be used to detect a cluster 151. For example, the following event instances relating to an interdomain routing protocol such as Border Gateway Protocol (BGP) in Cisco implementation (Cisco is a trademark of Cisco Systems, Inc.) may be clustered due to their string similarity and treated as a group of events:
BGP_CISCO_STATE_1
BGP_CISCO_STATE_2
BGP_CISCO_STATE_3

Multiple clusters 151 may be generated for a sample time using different distance metrics and/or by using different limits of the same distance metric.

The generated clusters may be tested 152 by the number of event log instances that belong to the cluster in the sample time. This may be tested as a percentage number of the total number of events in the sample time. For a cluster to be considered useful, a test may be whether a percentage threshold number of events in the sample time are members of the cluster.

The generated clusters may also or alternatively be compared 153 to other clusters to determine one or more clusters with the highest number of events in the sample time.

One or more clusters with a highest individual measure or comparison measure of events may be selected 154 as prime candidates of clustering. Once selected or as part of the selection process, a cluster may be tested 155 to determine if the number of events in the cluster is above a threshold percentage of total events in the sample window.

For example, it may only be used if the cluster accounts for more than 60% of the expected range. If the expected maximum count was 100 events in the sample time of the detected storm, there would have to be 60 events that were members of the cluster for it to be used.

Once the one or more clusters have been selected, the cluster may be used 156 as a new group and it may be determined if the cluster's event rate is outside a threshold deviation from an average for the cluster's event metric for the sample window. If the further test is not passed, further clustering 151 may be attempted with different distance metrics.

This method is capable of detecting a storm is occurring and capturing significant clusters of associated events although it does not need to be exhaustive. The described method does not guarantee that it will find all the events that constitute the storm. However, the requirement for total inclusivity for which events constitute the storm is not paramount compared to the requirement for accurately detecting a storm is occurring.

It should be noted that it is not accurate to simply apply the baseline algorithm to the raw event type, i.e. a metric for each event type that is seen without restricting to a sample time period. This is due to the fact that most baseline algorithms become extremely inaccurate or throw away the metric from analysis when the metric tends to zero, which is the cases for any individual event types. That is why the scores or deviations are calculated, only for available sample windows in which they appear in a detected storm.

The described method intrinsically couples storm detection and a deviation of a number of grouped or categorized events in the event samples in which the storm is detected due to the limitation of standard baselining algorithms.

Figure 2:
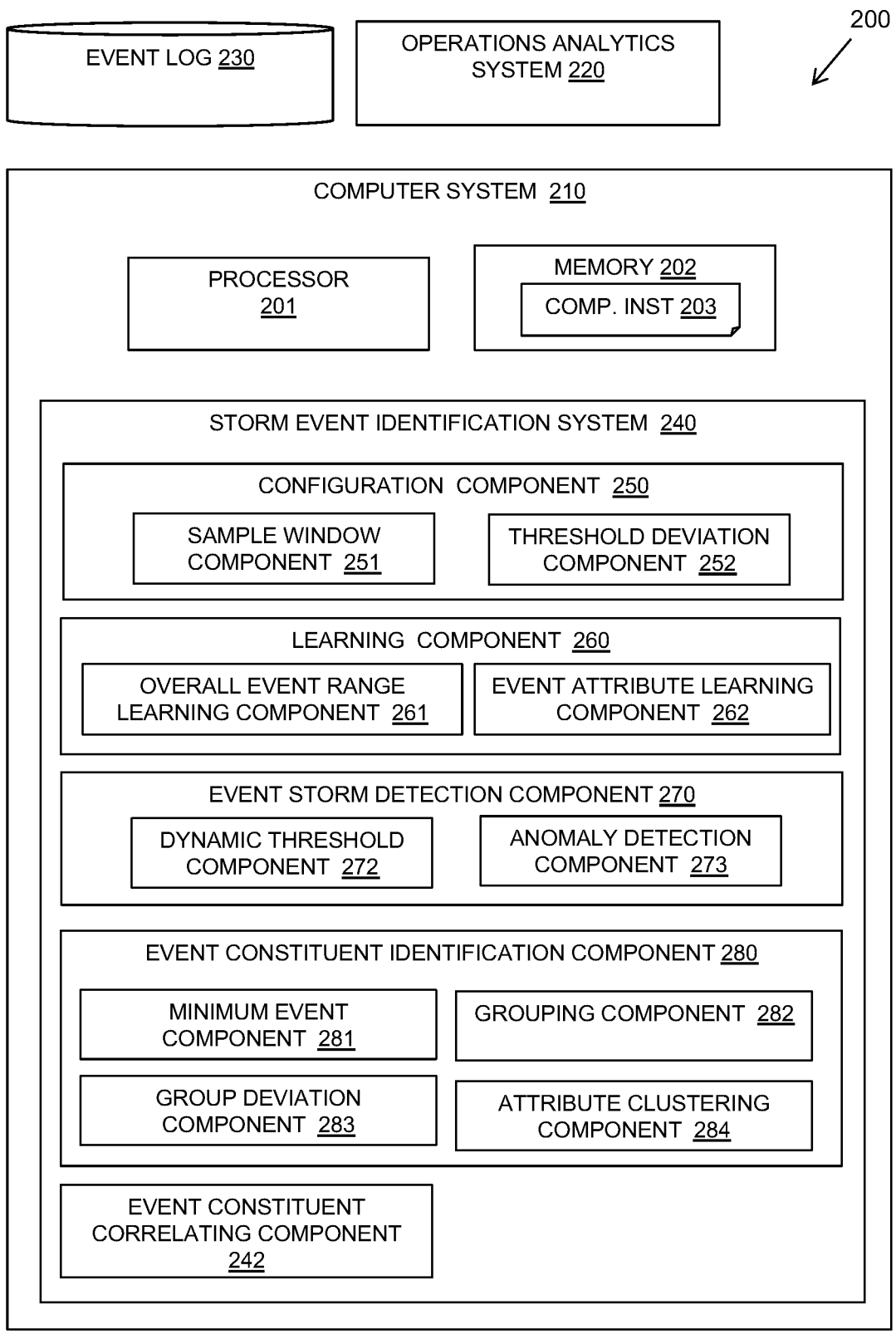
FIG. 2 is block diagram of an example embodiment of a system in accordance with the present invention.

FIG. 2 shows an example embodiment of a system 200 in which an event log 230 of events occurring in an information technology environment is dynamically evaluated to determine if a storm of events is taking place and to identify events that contribute to the storm.

The system 200 includes a computer system 210 providing a storm event identification system 240 and the computer system 210 includes at least one processor 201, a hardware module, or a circuit for executing the functions of the described components which may be software units executing on the at least one processor. Multiple processors running parallel processing threads may be provided enabling parallel processing of some or all of the functions of the components. Memory 202 may be configured to provide computer instructions 203 to the at least one processor 201 to carry out the functionality of the components.

The storm event identification system 240 may use an operations analytics system 220 that may analyze log event entries of the event log 230 of the information technology environment. The operations analytics system 220 may be provided remotely to the storm event identification system 240 or the storm event identification system 240 may be integral to an operations analytics system 220.

The storm event identification system 240 may include a configuration component 250 for configuring parameters of the storm event identification system 240, a learning component 260 for learning behavior of the events in the event log 230, an event storm detection component 270, an event constituent identification component 280, and an event constituent correlating component 242.

The configuration component 250 may include a sample window component 251 for configuring sample window durations to configure a granularity of the event storm detection. The sample time periods may be configured to be discrete or continuous and of one or more time durations. In one embodiment, they are configured as a short sample time window and a longer sample time window to capture different event storm behaviors.

The configuration component 250 may also include a threshold deviation component 252 for configuring threshold deviations to configure a sensitivity of the identification of event constituents.

The learning component 260 may include an overall event range learning component 261 for learning an expected event rate in one or more defined lengths of sample time periods in the event log as a whole. The learning component 260 may also include an event attribute learning component 262 for learning event attribute information in the one or more defined lengths of sample time periods for use in categorizing and clustering event attributes.

The event storm detection component 270 may include a dynamic threshold component 272 for using a dynamic threshold algorithm to determine a dynamic baseline range of expected event rates in the one or more defined lengths of sample time periods and an anomaly detection component 273 for using an anomaly detection algorithm to detect an anomaly from the dynamic baseline range indicating an event storm.

The event constituent identification component 280 may, for each of a group of events grouped by an event category occurring in a sample time period of an event storm, identify a group of events as constituting part of the event storm if the rate of the event occurrences of the group in the sample time period is outside a threshold deviation from an average for that group.

The event constituent identification component 280 may include a grouping component 282 for grouping events by an event category the event category includes an individual event attribute or a cluster of event attributes and a minimum event component 281 to ensure that groups of events include a minimum number of event instances.

The event constituent identification component 280 may include a group deviation component 283 for determining if the rate of the event occurrences of the group in the sample time period is outside a threshold deviation from an average for that group.

The event constituent identification component 280 may include an attribute clustering component 284 for clustering events in a sample time period by a distance metric of event attributes. For example, the distance metric of the event attributes may be a text string metric or a location metric.

The attribute clustering component 284 may include testing the clustering to meet a threshold percentage of event instances belonging to the cluster in a sample time period and may include selecting a cluster by comparing clusters with varying distance metrics in a sample time period.

The event constituent correlating component 242 may correlate all groups of events that are identified as constituents of the storm and may display the events as an output of the system.

Figure 3:
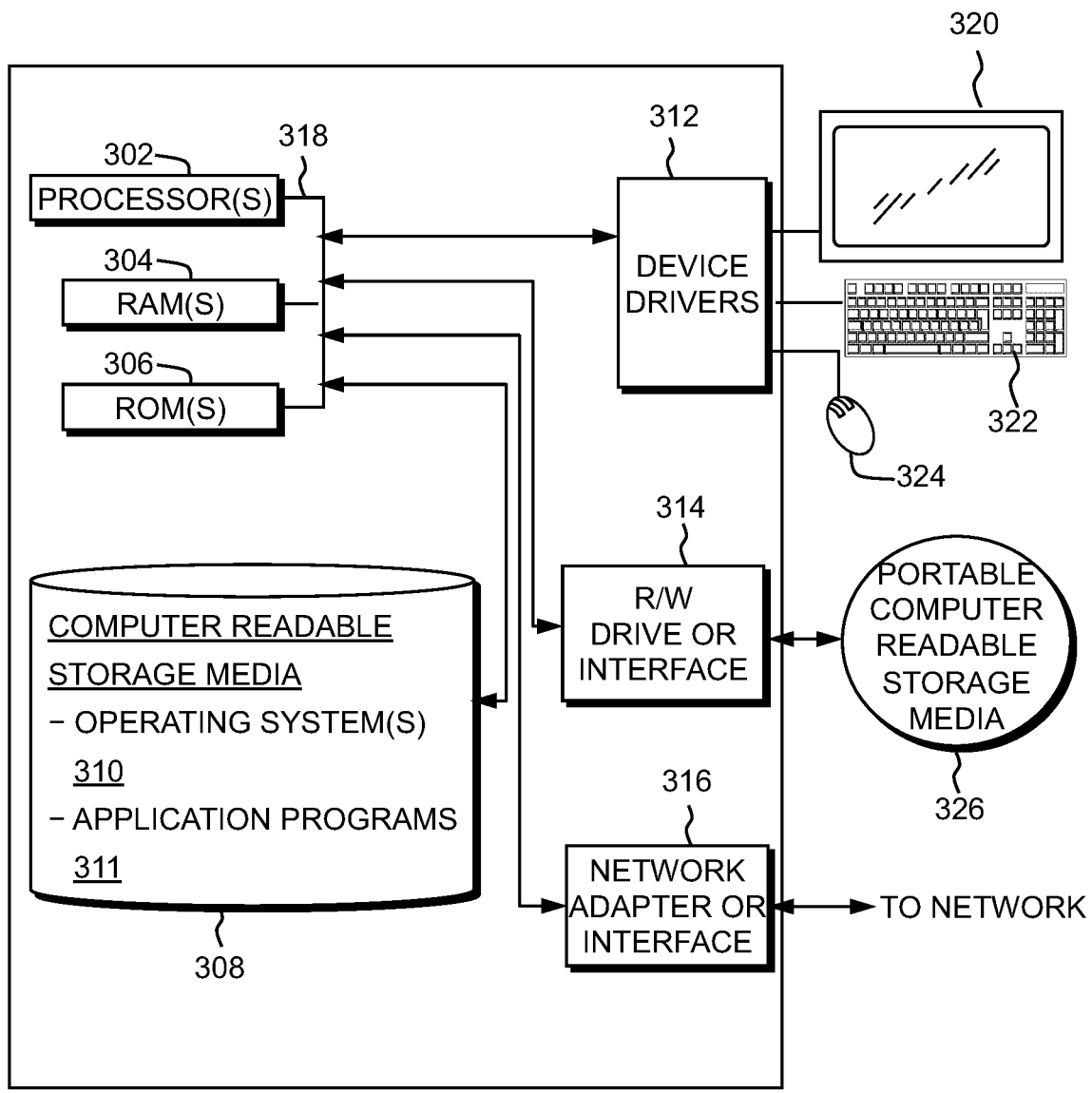
FIG. 3 is a block diagram of an embodiment of a computer system or cloud server in which the present invention may be implemented.
Figure 4:
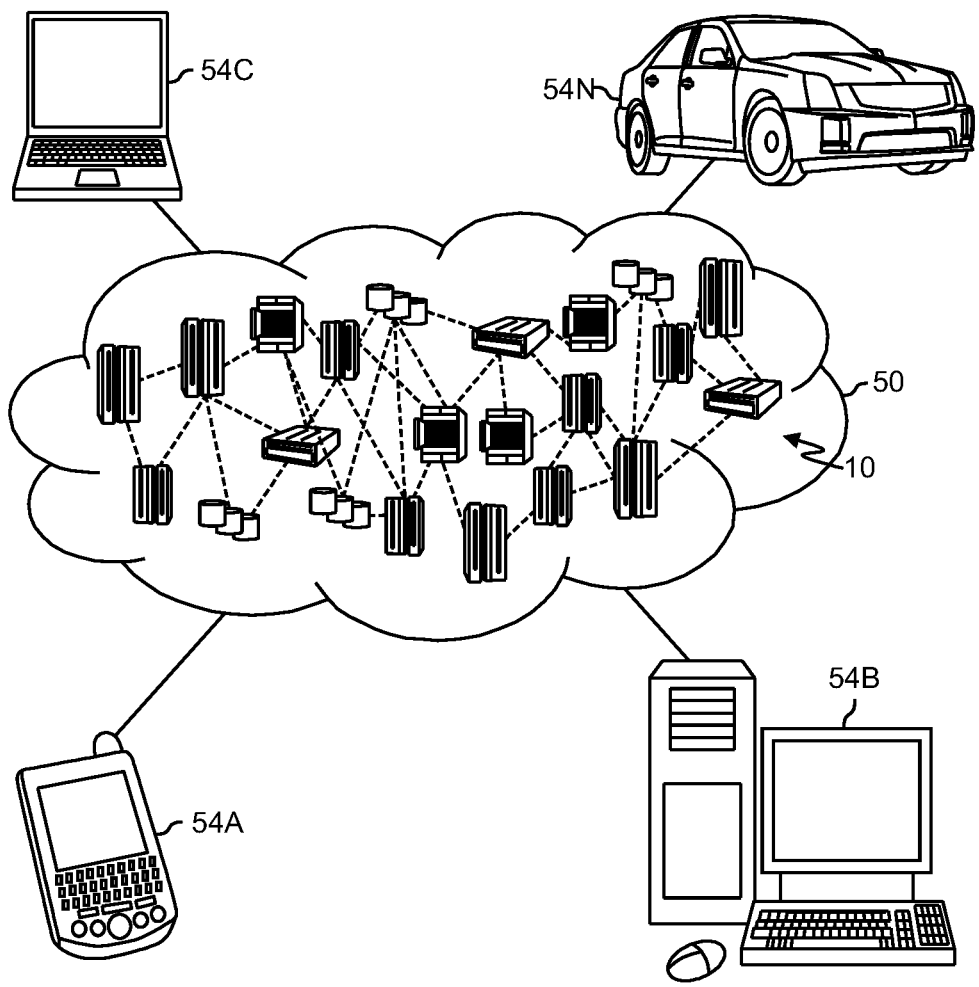
FIG. 4 is a schematic diagram of a cloud computing environment in which the present invention may be implemented.
Figure 5:
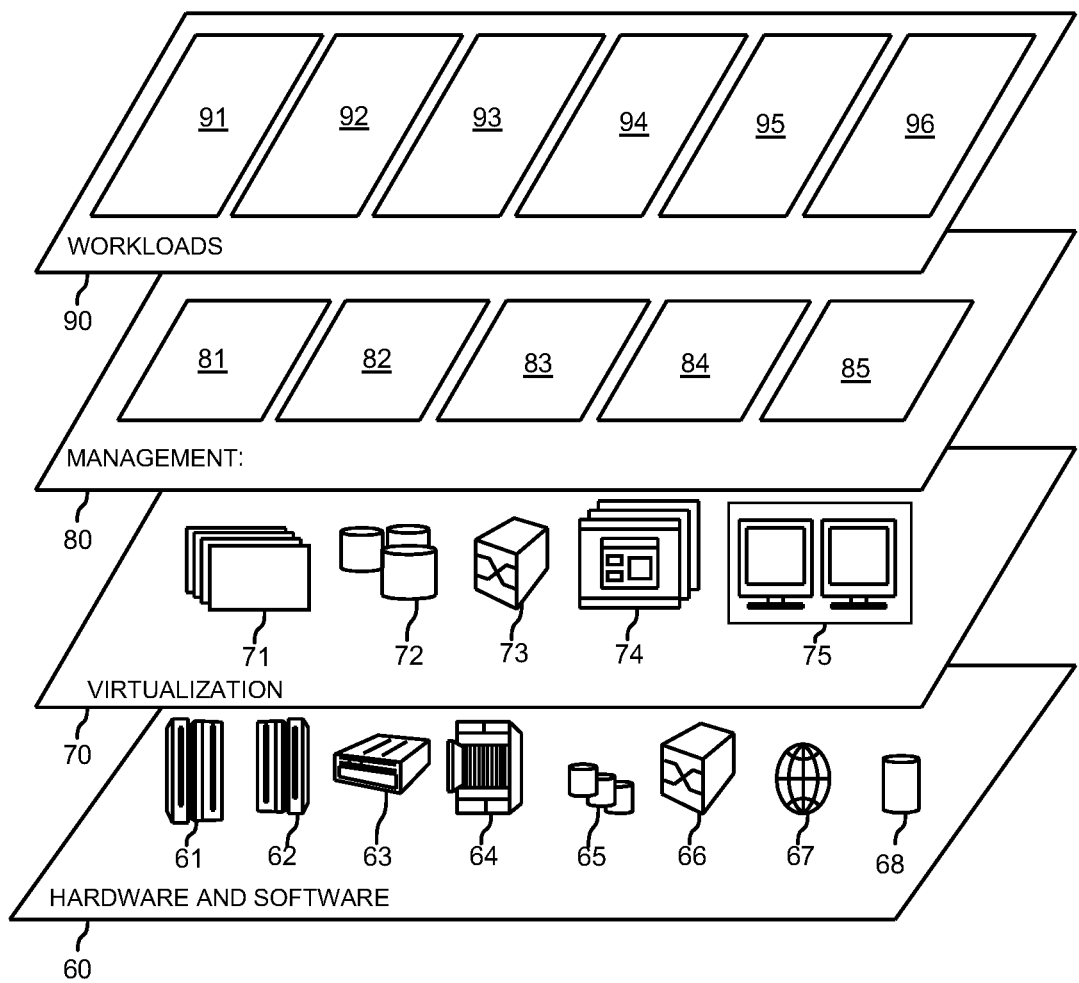
FIG. 5 is a diagram of abstraction model layers of a cloud computing environment in which the present invention may be implemented.

FIG. 3 depicts a block diagram of components of the computer system 210 of the system 200 of FIG. 2, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computer system 210 can include one or more processors 302, one or more computer-readable RAMs 304, one or more computer-readable ROMs 306, one or more computer readable storage media 308, device drivers 312, read/write drive or interface 314, and network adapter or interface 316, all interconnected over a communications fabric 318. Communications fabric 318 can be implemented with any architecture designed for passing data and/or control information between processors (such as microprocessors, communications and network processors, etc.), system memory, peripheral devices, and any other hardware components within the system.

One or more operating systems 310, and application programs 311, such as the event storm detection system 240 are stored on one or more of the computer readable storage media 308 for execution by one or more of the processors 302 via one or more of the respective RAMs 304 (which typically include cache memory). In the illustrated embodiment, each of the computer readable storage media 308 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computer system 210 can also include a R/W drive or interface 314 to read from and write to one or more portable computer readable storage media 326. Application programs 311 on computer system 210 can be stored on one or more of the portable computer readable storage media 326, read via the respective R/W drive or interface 314 and loaded into the respective computer readable storage media 308.

Computer system 210 can also include a network adapter or interface 316, such as a TCP/IP adapter card or wireless communication adapter. Application programs 311 on computer system 210 can be downloaded to the computing device from an external computer or external storage device via a network (for example, the Internet, a local area network or other wide area networks or wireless networks) and network adapter or interface 316. From the network adapter or interface 316, the programs may be loaded into the computer readable storage media 308. The network may comprise copper wires, optical fibers, wireless transmission, routers, firewalls, switches, gateway computers and edge servers.

Computer system 210 can also include a display screen 320, a keyboard or keypad 322, and a computer mouse or touchpad 324. Device drivers 312 interface to display screen 320 for imaging, to keyboard or keypad 322, to computer mouse or touchpad 324, and/or to display screen 320 for pressure sensing of alphanumeric character entry and user selections. The device drivers 312, R/W drive or interface 314, and network adapter or interface 316 can comprise hardware and software stored in computer readable storage media 308 and/or ROM 306.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and event log processing 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for identification of constituent events in an event storm in operations management, comprising: detecting an event storm by detecting an anomaly from a dynamic baseline range of expected event rates in a sample time period; and when the event storm is detected, for each of a group of events grouped by an event category and occurring in the sample time period of an event storm, identifying the group of events as constituting part of the event storm if the rate of the event occurrences of the group in the sample time period is outside a threshold deviation from an average for that group and clustering each of a group of events in the sample time period using a location metric, wherein the location metric is a location of events in the group of events.

2. The method as claimed in claim 1, including correlating multiple groups of events identified as constituting part of the event storm.

3. The method as claimed in claim 1, including learning an expected event rate in one or more defined lengths of sample time periods.

4. The method as claimed in claim 1, wherein detecting the event storm includes: using a dynamic threshold algorithm to determine a dynamic baseline range of expected event rates in one or more defined lengths of sample time periods; and using an anomaly detection algorithm to detect an anomaly from the dynamic baseline range indicating the event storm.

5. The method as claimed in claim 1, including learning event attribute information in one or more defined lengths of sample time periods.

6. The method as claimed in claim 1, wherein the event category includes an individual event attribute or a cluster of event attributes based on a distance metric.

7. The method as claimed in claim 1, wherein, if a group based on individual event attributes is not above a threshold deviation for the individual event attribute in the sample time period, clustering multiple individual event attributes to form the group of events.

8. The method as claimed in claim 1, including testing the clustering to meet a threshold percentage of event instances belonging to the cluster in the sample time period.

9. The method as claimed in claim 1, including selecting a clustering by comparing clusters with varying distance metrics in the sample time period.

10. The method as claimed in claim 1, wherein groups of events include a minimum number of event instances.

11. The method as claimed in claim 1, wherein the sample time periods are configured for granularity of the event storm detection including a short time window and a longer time window to capture different event storm behavior.

12. The method as claimed in claim 1, wherein a threshold deviation from an average for that group is a threshold Z-Score test of the group of events.

13. A computer-implemented method for identification of constituent events in an event storm in operations management, comprising: detecting an event storm by detecting an anomaly from a dynamic baseline range of expected event rates of an overall event population in a sample time period; and for the sample time period in a detected event storm, identifying event instances as being constituent events of the event storm by clustering event attributes using a location metric, wherein the location metric is a location of events in the group of events and determining if a rate of occurrence of event instances in the cluster in the sample time period is a threshold deviation from a norm for the clustered event attributes.

14. A system for identification of constituent events in an event storm in operations management, comprising: a processor and a memory configured to provide computer program instructions to the processor to execute the function of the components: an event storm detection component for detecting the event storm by detecting an anomaly from a dynamic baseline range of expected event rates in a sample time period; and an event constituent identification component for each of a group of events grouped by an event category occurring in the sample time period of the event storm, identifying a group of events as constituting part of the event storm if the rate of event occurrences of the group in the sample time period is outside a threshold deviation from an average for the group and clustering each of a group of events in the sample time period using a location metric, wherein the location metric is a location of events in the group of events.

15. The system as claimed in claim 14, including an event constituent correlating component for correlating multiple groups of events identified as constituting part of the event storm.

16. The system as claimed in claim 14, wherein the event storm detection component includes: a dynamic threshold component for using a dynamic threshold algorithm to determine a dynamic baseline range of expected event rates in one or more defined lengths of sample time periods; and an anomaly detecting component for using an anomaly detection algorithm to detect an anomaly from the dynamic baseline range indicating the event storm.

17. The system as claimed in claim 14, including a learning component for learning an expected event rate in one or more defined lengths of sample time periods and for learning event attribute information in the one or more defined lengths of sample time periods.

18. The system as claimed in claim 14, wherein the attribute clustering component includes testing the clustering to meet a threshold percentage of event instances belonging to the cluster in the sample time period.

19. The system as claimed in claim 14, wherein the attribute clustering component includes selecting a cluster by comparing clusters with varying distance metrics in the sample time period.

20. The system as claimed in claim 14, including a configuration component for configuring sample time periods for granularity of the event storm detection including a short time window and a longer time window to capture different event storm behavior.

21. A system for identification of constituent events in an event storm in operations management, comprising: a processor and a memory configured to provide computer program instructions to the processor to execute the function of the components: an event storm detection component for detecting an event storm by detecting an anomaly from a dynamic baseline range of expected event rates of an overall event population in a sample time period; and an event constituent identification for identifying event instances as being constituent events of the storm for the sample time period in a detected event storm by clustering event attributes using a location metric, wherein the location metric is a location of events in the group of events and determining if a rate of occurrence of event instances in the cluster in the sample time period is a threshold deviation from a norm for the clustered event attributes.

22. A computer program product for identification of constituent events in an event storm in operations management, the computer program product comprising a computer readable storage medium having program instructions embodied therewith, the program instructions executable by a processor to cause the processor to: detect the event storm by detecting an anomaly from a dynamic baseline range of expected event rates in a sample time period; and when the event storm is detected, for each of a group of events grouped by an event category and occurring in the sample time period, identify the group of events as constituting part of the event storm if the rate of the event occurrences of the group in the sample time period is outside a threshold deviation from an average for that group and clustering each of a group of events in the sample time period using a location metric, wherein the location metric is a location of events in the group of events.

* * * * *